US012415600B2

(12) United States Patent
Agostino et al.

(10) Patent No.: US 12,415,600 B2
(45) Date of Patent: Sep. 16, 2025

(54) MODULAR FIXED VTOL WITH LINE REPLACEABLE UNITS

(71) Applicant: Sierra Nevada Corporation, Sparks, NV (US)

(72) Inventors: Emily Agostino, Walnut Creek, CA (US); Sean Foxen, Alameda, CA (US); Curtis Leo, Los Gatos, CA (US); Stephen Morris, Sunnyvale, CA (US)

(73) Assignee: Sierra Nevada Company, LLC, Sparks, NV (US)

( * ) Notice: Subject to any disclaimer, the term of this patent is extended or adjusted under 35 U.S.C. 154(b) by 242 days.

(21) Appl. No.: 17/246,541

(22) Filed: Apr. 30, 2021

(65) Prior Publication Data

US 2021/0339860 A1    Nov. 4, 2021

Related U.S. Application Data

(60) Provisional application No. 63/018,392, filed on Apr. 30, 2020.

(51) Int. Cl.
*B64C 39/04* (2006.01)
*B64C 5/02* (2006.01)
(Continued)

(52) U.S. Cl.
CPC ............. *B64D 41/00* (2013.01); *B64C 5/02* (2013.01); *B64C 5/06* (2013.01); *B64C 29/0025* (2013.01);
(Continued)

(58) Field of Classification Search
CPC .. B64C 2211/00; B64C 29/0025; B64C 39/04
See application file for complete search history.

(56) References Cited

U.S. PATENT DOCUMENTS 4,653,826 A * 3/1987 Burgess ............. H01R 13/6315
439/248
9,505,484 B1 * 11/2016 Al-Sabah ............... B64D 27/20
(Continued)

FOREIGN PATENT DOCUMENTS

CN        102681527 A  *  9/2012   ........... B64C 13/504
FR        3 066 126 A1      11/2018
(Continued)

OTHER PUBLICATIONS

International Search Report in International Application No. PCT/US2021/030252, dated Sep. 17, 2021.
(Continued)

*Primary Examiner* — Timothy D Collins
*Assistant Examiner* — Terri L Filosi
(74) *Attorney, Agent, or Firm* — Mintz Levin Cohn Ferris Glovsky and Popeo, P.C.

(57) ABSTRACT

A modular VTOL drone aircraft can include a primary processor, a plurality of propellers, one or more line replacement modules ("LRMs") and one or more line replacement units ("LRUs"). LRMs can include a fuselage, a center wing, two booms, two outer wings, two vertical tails, a horizontal tail, and/or an engine. LRUs can include an avionics module, a radio communications assembly, a sensor package assembly, an ISR assembly, and/or a deployable payload assembly. Each LRM and LRU can be self-contained and removably attached to the remainder of the VTOL drone. Each LRM can be readily interchanged with another similar LRM, which can be of a different size. LRM interfaces can include a blind mate electric connector and/or a floating connector.

17 Claims, 10 Drawing Sheets

(51) Int. Cl.

| | | |
|---|---|---|
| *B64C 5/06* | (2006.01) | |
| *B64C 29/00* | (2006.01) | |
| *B64C 39/08* | (2006.01) | |
| *B64D 27/02* | (2006.01) | |
| *B64D 41/00* | (2006.01) | |
| *B64U 10/20* | (2023.01) | |
| *B64U 30/10* | (2023.01) | |
| *B64U 30/20* | (2023.01) | |
| *G07C 3/00* | (2006.01) | |
| *B64U 101/60* | (2023.01) | |

(52) U.S. Cl.
CPC .............. *B64C 39/04* (2013.01); *B64C 39/08* (2013.01); *B64D 27/02* (2013.01); *B64U 10/20* (2023.01); *B64U 30/10* (2023.01); *B64U 30/20* (2023.01); *G07C 3/00* (2013.01); *B64C 2211/00* (2013.01); *B64U 2101/60* (2023.01)

(56) References Cited

U.S. PATENT DOCUMENTS

| 2012/0181857 A1 | 7/2012 | Sechrist | |
| 2017/0001724 A1* | 1/2017 | Yates | B64U 70/83 |
| 2017/0057633 A1* | 3/2017 | Morris | G05D 1/102 |
| 2017/0320570 A1 | 11/2017 | Horn | |
| 2018/0002003 A1 | 1/2018 | Won et al. | |
| 2018/0086458 A1 | 3/2018 | Sartorius et al. | |
| 2018/0273158 A1 | 9/2018 | Courtin | |
| 2019/0031361 A1 | 1/2019 | McCullough et al. | |
| 2019/0210724 A1 | 7/2019 | Bublitsky | |
| 2020/0172236 A1* | 6/2020 | George | B64C 1/26 |
| 2020/0361634 A1* | 11/2020 | Gil | G07C 5/008 |
| 2021/0197965 A1* | 7/2021 | Kunz | B64C 39/04 |

FOREIGN PATENT DOCUMENTS

| JP | 2003179608 A | * | 6/2000 | ............. B64D 45/00 |
| JP | 2002505219 A | * | 2/2002 | ......... B60R 16/0231 |
| WO | 2012/047337 A1 | | 4/2012 | |

OTHER PUBLICATIONS

Dova, "Software-defined avionics and mission systems in future vertical lift aircraft," Naval Post Graduate School, Montery CA, 2015, pp. 6, 7, 9, 23, 72, Retrived on Aug. 9, 2021 <https://apps.dtic.mil/stl/citations/ADA620625>.

* cited by examiner

MODULAR FIXED VTOL WITH LINE REPLACEABLE UNITS

CROSS-REFERENCE TO RELATED APPLICATIONS

This application claims the benefit of U.S. Provisional Application No. 63/018,392, filed Apr. 30, 2020, which is hereby incorporated by reference in its entirety.

TECHNICAL FIELD

The present disclosure relates generally to drone aircraft, and more particularly to VTOL drone aircraft having delivery systems.

BACKGROUND

Drone aircraft can be useful in a variety of utility functions. In particular, vertical take off and landing ("VTOL") drone aircraft can be especially useful in delivering a payload or other cargo due to the ability of these drones to land vertically for delivery in a relatively small space. In addition to the multiple rotors that are typical for such drones, some VTOL drone aircraft can also include a fixed wing design and an alternative form of thrust for efficiency in traveling longer distances. Such an alternative may include a fossil fuel burning combustion engine arranged to provide horizontal thrust.

Unfortunately, there can still be some drawbacks with the use of VTOL fixed wing drone aircraft. Different types of payloads or cargo may require different types of aircraft, for example, with larger or heavier deliveries requiring larger drones, resulting in a need for several different sizes of drone aircraft. In addition, any significant component on a drone requiring repair or replacement can result in the drone being out of service while the repair or replacement is performed, which may involve the drone being out of service for a significant amount of time.

Although traditional ways of delivering cargo with VTOL drone aircraft have worked well in the past, improvements are always helpful. In particular, what is desired are improved VTOL drone aircraft that are more flexible in the different types and sizes of cargo that can be delivered, and that also have the ability to be repaired or adjusted faster in order to reduce the periods that they are out of service.

SUMMARY

It is an advantage of the present disclosure to provide VTOL drone aircraft that are more flexible in the different types and sizes of cargo that can be delivered, and that also have reduced time periods that they are out of service for repair or adjustments. The disclosed features, apparatuses, systems, and methods provide improved delivery drone aircraft solutions that involve the substantial use of modular components to achieve these advantages. This can be accomplished in multiple ways, such as by providing numerous self-contained line replaceable modules ("LRMs") in the form of significant aircraft component assemblies, as well as numerous line replaceable units ("LRUs") in the form of discrete electronics and deployable payload assemblies. These LRMs and LRUs can be interchangeable with similar LRMs and LRUs, which may be the same size or of varying sizes and configurations.

In various embodiments of the present disclosure, a VTOL drone aircraft can include a fuselage, a plurality of propellers, an LRU, and a first LRM. The primary processor can be located at the fuselage. Both the LRU and the first LRM can be self-contained, and the LRU can be removably coupled to the fuselage while the LRM can have a first interface configured to removably couple the LRM to the remainder of the VTOL drone aircraft. The LRU can be an avionics module, a radio communications assembly, a sensor package assembly, an intelligence, surveillance, and reconnaissance ("ISR") assembly, or a deployable payload assembly. The first LRM can be a wing assembly, a tail assembly, a boom, or an engine, and the first LRM can include an electrical item.

In various detailed embodiments, the first interface can include an electrical connection configured to transmit power to the electrical item, and communication connections configured to transmit communications from the processor to the electrical item. The primary processor can be configured to perform a diagnostic check on the electrical item when the first LRM is coupled to the remainder of the VTOL drone aircraft. The first LRM can be readily interchangeable with a similar LRM of a different size, having different functionalities, or both. The VTOL drone aircraft can also include a second self-contained LRM having a second interface configured to couple the second LRM to the remainder of the VTOL drone aircraft. In some arrangements, the first LRM can be a wing assembly and the second LRM can be a tail assembly or a boom that includes multiple propellers coupled thereto. The boom can also include a separate dedicated electronic speed control unit for each of the multiple propellers. The wing assembly can be removably coupled to the fuselage while the boom is removably coupled to the wing assembly. The first interface can include an electrical blind mate connector and/or a floating connector. In some embodiments, the primary processor can be configured to detach the first LRM from the remainder of the VTOL drone aircraft while the VTOL drone aircraft is in flight.

In various further embodiments of the present disclosure, a modular VTOL drone aircraft can include a fuselage module containing at least a primary processor, a center wing module removably coupled to the fuselage module, a first boom module removably coupled to the center wing module, a first outer wing module removably coupled to the first boom module, a second boom module removably coupled to the center wing module, a second outer wing module removably coupled to the second boom module, and an empennage assembly removably coupled to the first boom module and the second boom module. Each of the fuselage, center wing, first boom, first outer wing, second boom, and second outer wing modules can be self-contained. Each of the boom modules can include a plurality of propellers coupled thereto. In some alternative arrangements, more than two boom modules can be used, with each separate boom module preferably coupling to other modules such as the center wing, outer wings, and empennage assembly.

In various detailed embodiments, the empennage assembly can include a first vertical tail module removably coupled to the first boom module, a second vertical tail module removably coupled to the second boom module, and a horizontal tail module removably coupled to the first vertical tail module and the second vertical tail module. Each of the first vertical tail, second vertical tail, and horizontal tail modules can be self-contained. Further, the primary processor can be configured to perform a diagnostic check on each module when the module is coupled to the remainder of the VTOL drone aircraft. The modular VTOL drone aircraft can also include one or more LRUs, such as those listed above.

In still further embodiments of the present disclosure, a modular VTOL drone aircraft kit can include a fuselage module containing at least a primary processor, a center wing module configured to be removably coupled to the fuselage module, a first boom module including a first plurality of propellers coupled thereto that is configured to be removably coupled to the center wing module, a first outer wing module configured to be removably coupled to the first boom module, a second boom module including a second plurality of propellers coupled thereto that is configured to be removably coupled to the center wing module, a second outer wing module configured to be removably coupled to the second boom module, a first vertical tail module configured to be removably coupled to the first boom module, a second vertical tail module configured to be removably coupled to the second boom module, and a horizontal tail module configured to be removably coupled to the first vertical tail module and the second vertical tail module. Each of these modules can be self-contained.

The kit can also include an engine module that can be self-contained and configured to be removably coupled to the fuselage module. The kit can also include an LRU removably coupled to the fuselage, and this LRU can be self-contained and can be an avionics module, a radio communications assembly, a sensor package assembly, an ISR assembly, or a deployable payload assembly. In various arrangements, the kit can be configurable to be stored in a container that is less than half the length and half the width of the modular VTOL drone aircraft when assembled.

Other apparatuses, methods, features, and advantages of the disclosure will be or will become apparent to one with skill in the art upon examination of the following figures and detailed description. It is intended that all such additional apparatuses, methods, features and advantages be included within this description, be within the scope of the disclosure, and be protected by the accompanying claims.

BRIEF DESCRIPTION OF THE DRAWINGS

The included drawings are for illustrative purposes and serve only to provide examples of possible structures and arrangements for the disclosed apparatuses, systems and methods for a modular VTOL drone aircraft. These drawings in no way limit any changes in form and detail that may be made to the disclosure by one skilled in the art without departing from the spirit and scope of the disclosure.

DETAILED DESCRIPTION

Figure 1A:
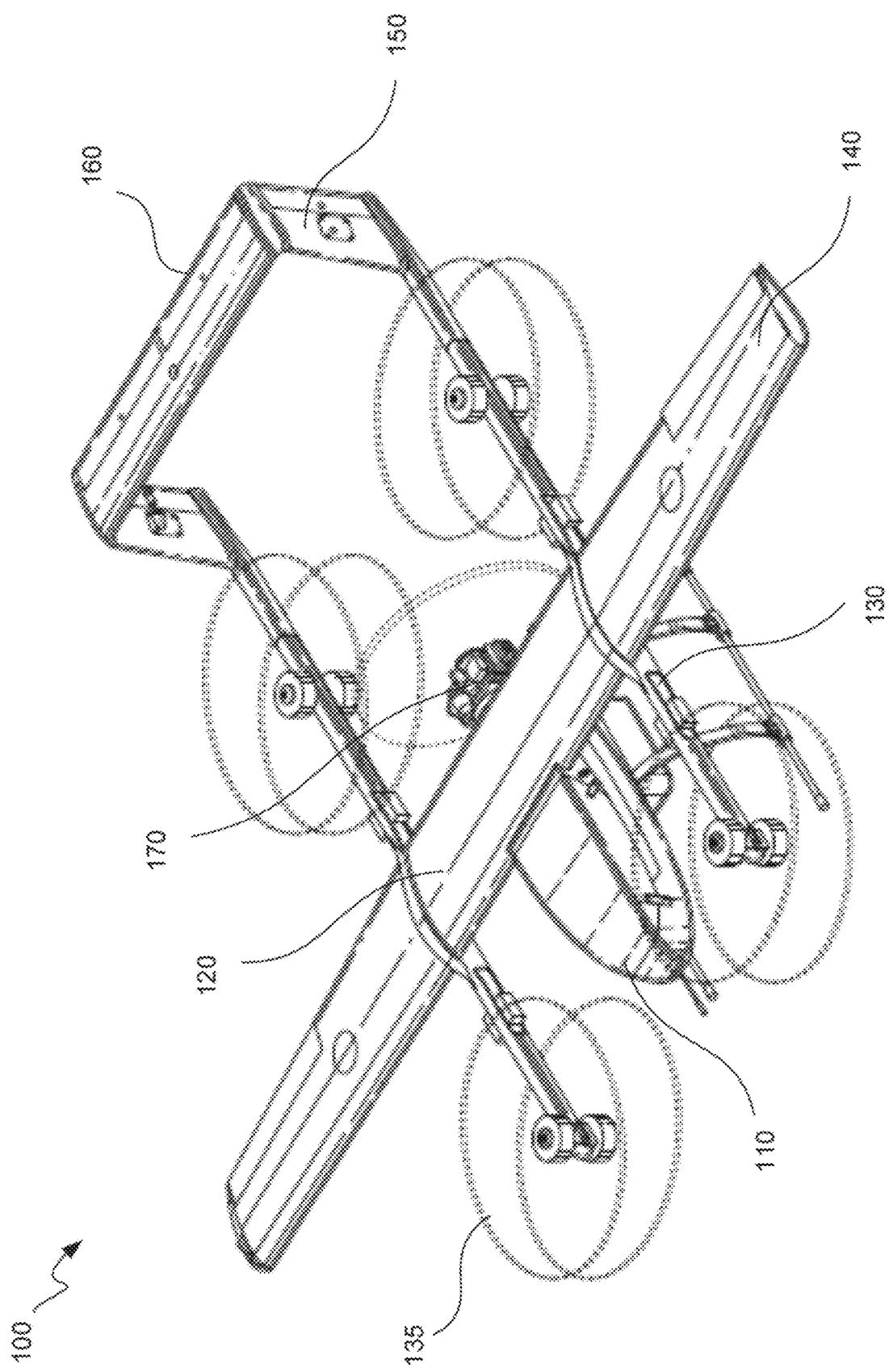
FIG. 1A illustrates in front perspective view an example modular VTOL drone aircraft according to one embodiment of the present disclosure.

Exemplary applications of apparatuses, systems, and methods according to the present disclosure are described in this section. These examples are being provided solely to add context and aid in the understanding of the disclosure. It will thus be apparent to one skilled in the art that the present disclosure may be practiced without some or all of these specific details provided herein. In some instances, well known process steps have not been described in detail in order to avoid unnecessarily obscuring the present disclosure. Other applications are possible, such that the following examples should not be taken as limiting. In the following detailed description, references are made to the accompanying drawings, which form a part of the description and in which are shown, by way of illustration, specific embodiments of the present disclosure. Although these embodiments are described in sufficient detail to enable one skilled in the art to practice the disclosure, it is understood that these examples are not limiting, such that other embodiments may be used, and changes may be made without departing from the spirit and scope of the disclosure.

The present disclosure relates in various embodiments to features, apparatuses, systems, and methods for a modular VTOL drone aircraft. The disclosed embodiments result in VTOL drone aircraft that are more flexible in the different types and sizes of cargo that can be delivered, and that also have reduced time periods that they are out of service for repair or adjustments. In particular, the disclosed embodiments can utilize a system architecture that includes LRMs and LRUs that can be removed and replaced anywhere to restore a compromised drone to an operational ready condition. This can result from the ability to isolate modules when troubleshooting problems arise, and to remove faulty modules with little disassembly. This then results in reduced down times that a drone would otherwise experience due to the extensive repair steps typically needed by a traditional integrated drone design.

In various detailed examples, which are merely illustrative and non-limiting in nature, each LRM and LRU can be a self-contained integrated assembly that connects with the rest of the drone by way of standardized interfaces that require minimal tool use for installation or removal. Removing a given LRM or LRU from the drone can generally involve removing a few externally accessible fasteners and unplugging a blind mate floating connector or other similar electrical and communications coupling component, such that removal or disassembly of any other module is unnecessary.

In some arrangements, a specific process sequence can be followed for coupling or decoupling a given LRM or LRU. For example, coupling a new LRM to the drone can involve first establishing a ground connection between the new LRM and the drone, then establishing a spark suppression circuit to prevent unwanted spark or power surges, then establishing any applicable fuel connection between the new LRM and the drone, then establishing a power connection from the drone to the new LRM, then establishing a communications connection between the new LRM and the drone, and lastly establishing any final physical mechanical fastenings for the new LRM to the drone. In some arrangements, floating blind-mate connectors on both the new LRM and drone can be mechanically designed such that this specific sequence of connections is physically forced when the floating blind-mate connectors are coupled to each other. A decoupling of the LRM from the drone can involve a specific process sequence in the opposite order.

LRM split lines and interfaces can be defined so that the drone can break down into a small and easily transportable footprint and can isolate various aircraft functions to specific regions in order to allow for the drone to have multiple different configurations. For example, all components required to operate and control an engine can be contained within an engine LRM. In this manner, any engine LRM having the standardized engine LRM interface can be installed at that interface to the remainder of the drone, such as at the aft of a fuselage LRM. As another example, all components required to operate and control an outer wing can be contained within an outer wing LRM, such that any outer wing LRM having the standardized outer wing LRM interface can be installed at that interface to the remainder of the drone.

In addition to providing the ability to remove and replace items for faster serviceability, the modular design allows the drone to adopt several other configurations without the need to redesign an entire aircraft. For example, different outer wing LRMs having varying sizes and weights can be removed and installed to the same base drone depending upon the needs of a given drone aircraft. This provides the ability to configure a drone aircraft based upon operational needs without having to purchase several discrete traditional drones or airframes. The modular drone aircraft can have the utility of several different aircraft designs with a single core airframe and can remain in the same configuration for long term use or can be reconfigured as needs change over time. An example base VTOL drone configuration is provided at FIGS. 1A-1D below. Many other modular configurations that achieve specific drone functionalities can also be used, and specific alternative drone configurations are provided in FIGS. 5-8 below. It will be understood that these variations are only examples, and that many other drone configurations not disclosed herein are also possible.

Although various embodiments disclosed herein discuss modular fixed wing drone delivery aircraft, it will be readily appreciated that the disclosed features, apparatuses, systems, and methods can similarly be used for any relevant aircraft. For example, the fixed outer wings and tail empennage can be removed in favor of a pure VTOL quadcopter in some arrangements, while other configurations can involve the addition of traditional landing gear and other suitable components that facilitate usage as a non-VTOL aircraft. Some configurations may forego delivery capabilities for an aircraft that serves only as a surveillance device, while others can include surveillance aspects to existing delivery abilities. Other applications, arrangements, and extrapolations beyond the illustrated embodiments are also contemplated.

Referring first to FIG. 1A, an example modular VTOL drone aircraft is illustrated in front perspective view. Drone 100 can include a fuselage module 110, a center wing module 120, two boom modules 130, two outer wing modules 140, two vertical tail modules 150, a horizontal tail module 160, and an engine module 170. Each of these can be a self-contained LRM that is readily removable and interchangeable with other similar LRMs. Each LRM can include various components, such as, for example, multiple propellers 135 located on each boom module 130.

Figure 1B:
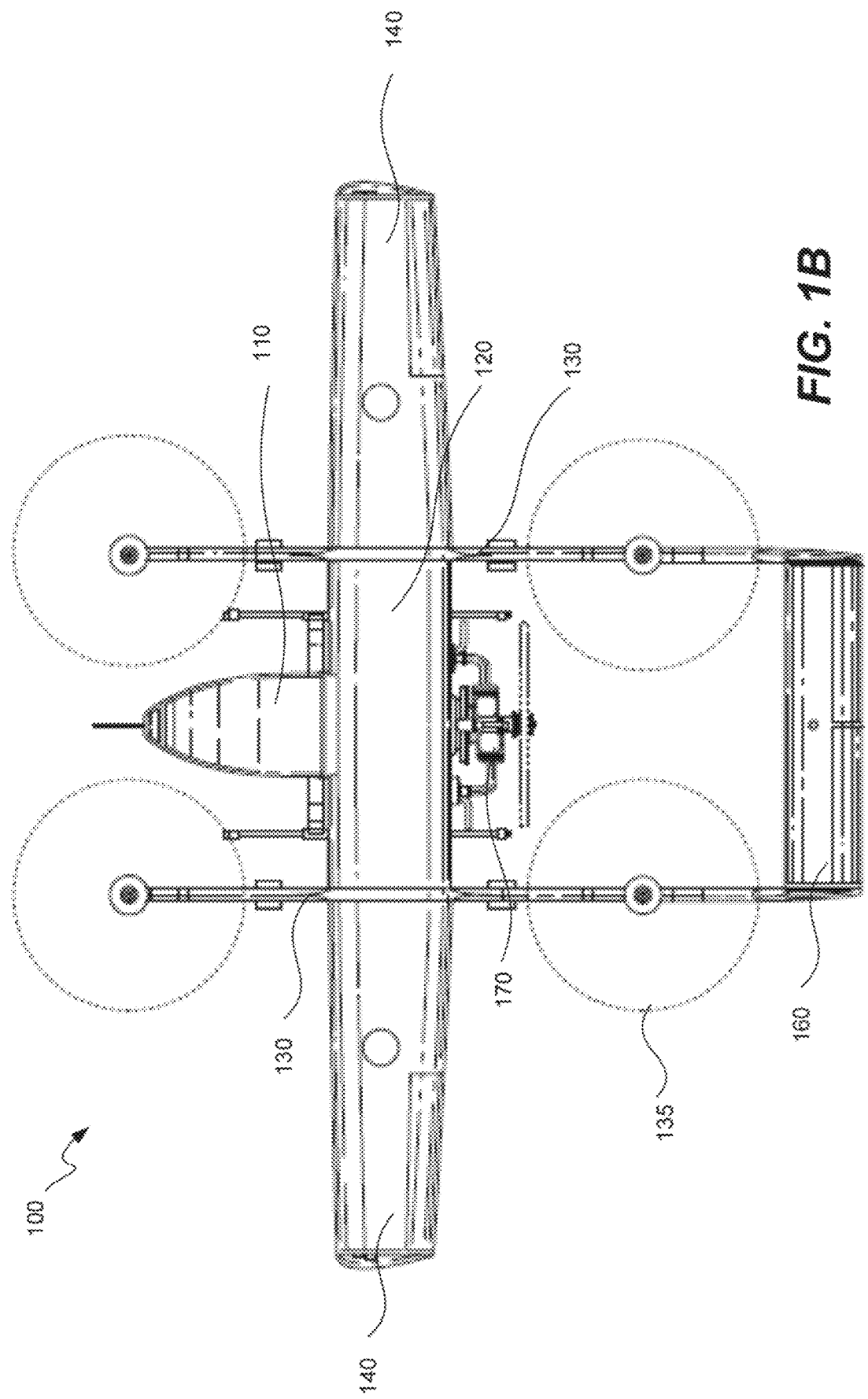
FIG. 1B illustrates in top plan view the modular VTOL drone aircraft of FIG. 1A according to one embodiment of the present disclosure.
Figure 1C:
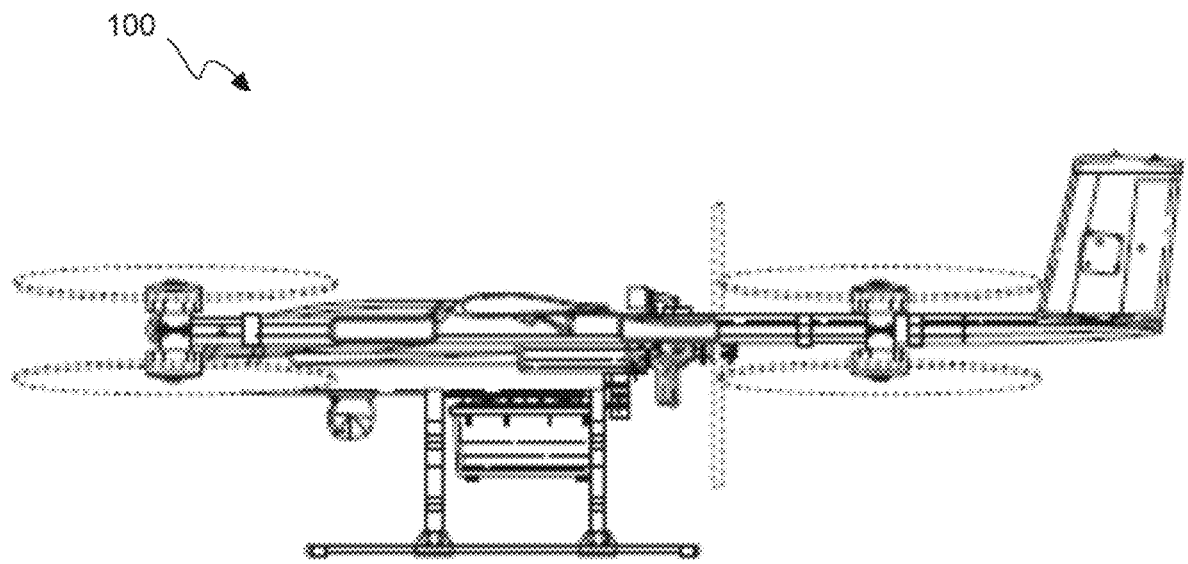
FIG. 1C illustrates in side elevation view the modular VTOL drone aircraft of FIG. 1A according to one embodiment of the present disclosure.
Figure 1D:
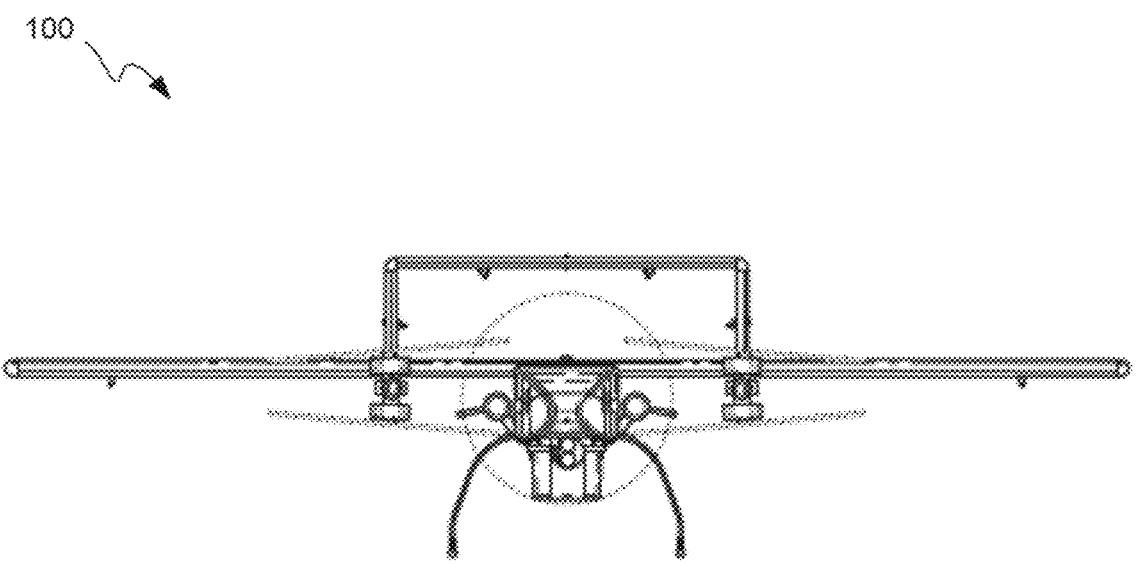
FIG. 1D illustrates in front elevation view of the modular VTOL drone aircraft of FIG. 1A according to one embodiment of the present disclosure.

FIGS. 1B, 1C, and 1D illustrate the example modular VTOL drone aircraft of FIG. 1A in top plan, side elevation, and front elevation views respectively. These figures simply present different views of the same drone 100 and its various LRMs. While the embodiments shown here for purposes of illustration include four propellers 135 on each boom module 130 for a total of eight propellers, it will be readily appreciated that alternative numbers of propellers could be used. For example, a similar drone configuration might utilize only four propellers to form a quadcopter.

Figure 2:
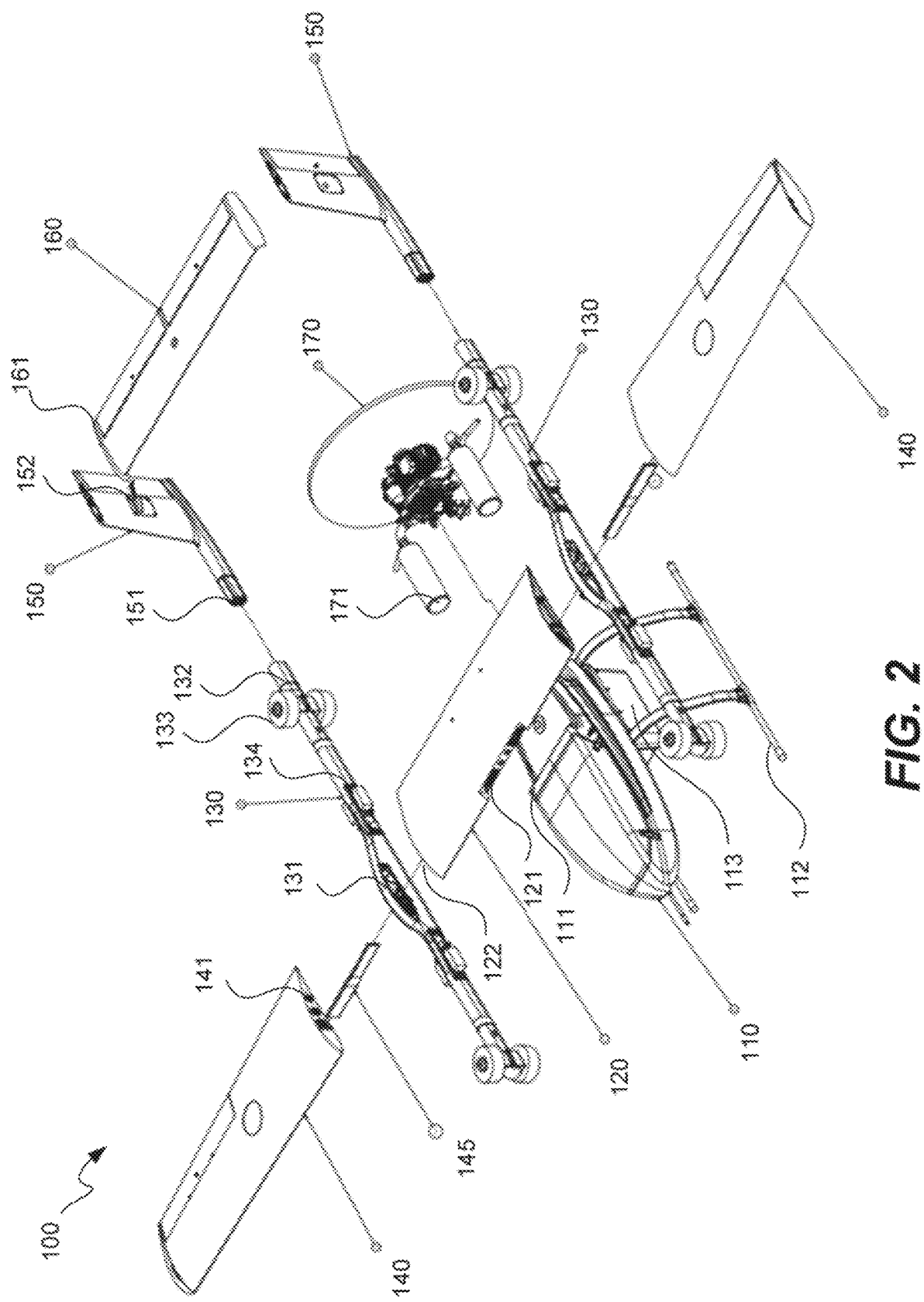
FIG. 2 illustrates in front perspective partially exploded view an example modular VTOL drone aircraft having multiple LRMs according to one embodiment of the present disclosure.

Turning next to FIG. 2 an example modular VTOL drone aircraft having multiple LRMs is shown in front perspective partially exploded view. Although various self-contained LRMs for drone 100 are illustrated and discussed herein for purposes of illustration, it will be appreciated that not all of the disclosed LRMs are required for a given drone, and that other types and configurations of LRMs not shown may be used alternatively or in addition to those shown. Again, drone 100 can include a fuselage module 110, a center wing module 120, two boom modules 130, two outer wing modules 140, two vertical tail modules 150, a horizontal tail module 160, and an engine module 170. In addition, two wing joiners 145 can also be considered separate LRMs that can be used to interchangeably attach the two outer wing modules 140 to both sides of the center wing module 120.

Fuselage module 110 can be its own LRM that can also be modularly exchanged for another fuselage module while the rest of drone 100 remains. In addition to the various LRUs that can be contained within fuselage module 110, as set forth in greater detail below, fuselage module 110 can also contain an internal battery (not shown) and a primary processor (not shown). The battery can provide electrical power for all of the propellers as well as the various electrical and computing components distributed throughout drone 100. In some embodiments, an alternative power source other than a battery can be used. Fuselage module 110 can also have a fuselage to center wing interface 111 to facilitate coupling to center wing module 120, as well as landing skids 112 and a payload or cargo container 113. In some arrangements, the landing skids 112 and cargo container 113 can also be modular and interchangeable with similar modular components.

Center wing module 120 can be another LRM that modularly couples to the fuselage module 110. Center wing to fuselage interface 121 can couple to the fuselage to center wing interface 111 of the fuselage module to accomplish this coupling. Both interfaces 111, 121 can include blind mate electrical connectors that include a power line as well as one or more signal or communication lines. One or both interfaces 111, 112 can also include a floating connector to facilitate a readily simplified plug in coupling regardless of any offset in specific parts or components, as will be readily appreciated. Various mechanical items can also facilitate a fast and firm coupling of center wing module 120 to fuselage module 110. In a particular non-limiting example, four bolts can be used to attach the center wing module 120 to the fuselage module 110 mechanically. Two bolts toward the front underside of the center wing module 120 can slot through keyholes in the fuselage module 110 to lock in the center wing module and prevent relative side to side motion, while two bolts can be inserted into narrow openings at the rear of the center wing module and through to narrow openings in the fuselage module to further lock in the center wing module to the fuselage module and prevent relative fore to aft motion.

Two boom modules 130 can be additional LRMs that modularly couple to distal ends of the center wing module 120. Each boom module 130 can have a boom to wing interface 131, a boom to vertical tail interface 132, a rotor 133 for each propeller (not shown), and an electronic speed control unit 134 for each propeller, among other possible electrical items. The boom to wing interface 131 on each boom module 130 can couple to a center wing to boom interface 122 on the center wing module 120. Again, both interfaces 122, 131 can include blind mate electrical connectors and floating connectors to facilitate ready plug in connections for all needed power and signal lines to and through the boom modules 130. Various mechanical items can also similarly facilitate a fast and firm coupling of each boom module 130 to the center wing module 120. In another particular non-limiting example, interface 131 on boom module 130 can have a custom shaped mechanical boss that protrudes into a receiving lip at the interface 122 on the center wing module 120. This mechanical boss can help to index the boom module 130 for proper alignment and can also distribute torsional forces about the mechanical interfaces. Once inserted, this boss can be locked down mechanically with one or more screws or bolts. In various alternative arrangements, more than two boom modules can be used. As one non-limiting example, each boom module 130 can be split into separate front and rear booms modules, resulting in a drone having a four boom module arrangement.

Two outer wing modules 140 can be further LRMs that modularly couple to the opposite sides of boom modules 130 at the boom to wing interfaces 131, which can be double sided interfaces. Each outer wing module 140 can have an outer wing to boom interface 141, as well as typical wing ailerons, tabs, and other electrically operated items. As in the foregoing interfaces, both interfaces 131, 141 can include blind mate electrical connectors and floating connectors to facilitate ready plug in connections for all needed power and signal lines to the outer wing modules 140. Boom to wing interface 131 can also have a custom shaped mechanical boss on its outer wing side that protrudes into a receiving lip at the outer wing to boom interface 141 to facilitate a mechanical coupling that can also be locked down by way of one or more screws or bolts once inserted.

A wing joiner 145 can also be used at each junction of outer wing module 140 to boom module 130 to center wing module 120. Wing joiner 145 can insert into a slot within outer wing module 140 and extend through an opening in boom module 130 and into a slot within center wing module 120. In various arrangements, wing joiner 145 can serve both to facilitate alignment of boom module 130 and outer wing module 140 with respect to center wing module 120. In addition, wing joiner 145 can also distribute or transfer loads from the outer wing module 140 through the boom module 130 and to the center wing module 120. Load sensors may be located at or about wing joiner 145, such that loads can be monitored during flight to ensure that proper loads are not exceeded. In some embodiments, wing joiner 145 can be considered a separate LRM or wing assembly module. Different wing joiners 145 may be needed depending upon the overall configuration of drone 100. For example, drone configurations using larger wing modules may require the use of larger wing joiners 145.

An empennage assembly can include both vertical tail modules 150 and the horizontal tail module 160. This empennage assembly can be removed and service or interchanged as a single unit, or each of the vertical tail modules 150 and/or horizontal tail module 160 can be removed as a separate LRM as may be appropriate. In either event, each vertical tail module 150 can modularly couple to the aft end of a boom module 120. This can involve the vertical tail to boom interface 151 inserting into the boom to vertical tail interface 132. Both interfaces 132, 151 can include blind mate electrical connectors and floating connectors to facilitate ready plug in connections for all needed power and signal lines to and through the vertical tail modules 150. One or more bolts or screws can be used to lock the vertical tail module 150 in place when interface 151 is inserted into interface 132.

Horizontal tail module 160 can also be a separate LRM that removably attaches to both of the vertical tail modules 150. This can be accomplished by way of horizontal tail to vertical tail interfaces 161 on both ends of the horizontal tail module 160 coupling to vertical tail to horizontal tail interfaces 152 located on the vertical tail modules 150. Again, both interfaces 152, 161 can utilize blind mate electrical connectors and floating connectors to facilitate coupling. As one example of a possible mechanical coupling arrangement, the top of vertical tail module 150 can have a keyhole bracket to which the horizontal tail module 160 indexes, and the horizontal tail module can then slide forward to lock in place. One or more screws or bolts can be then be used, such as at the blend area of the horizontal tail module, to hold the horizontal tail module 160 in position against the vertical tail modules 150.

Similar to outer wing modules 140, vertical tail modules 150 and horizontal tail module 160 can include typical ailerons, rudders, tabs, and other electrically controlled items. All ailerons, tabs, rudders, and the like can be controlled by servo motors that can be located internally to each individual module, or can be relocated externally to another location, such as the fuselage.

Engine module 170 can be another LRM that is modularly coupled to the aft of the fuselage module 110. This can be accomplished by way of multiple mechanical mounts 171, such as six mounts for example, at the back of the fuselage module 110. Engine module 170 can be a self-contained module that includes a liquid fuel-based engine for horizontal thrust over long distances.

In various embodiments, some or all interface mating surfaces between the various LRMs can include the use of machined ribs. The blind mate and floating connectors can all be mounted to the machined ribs. In addition, some or all of the mechanical locks can also interface at the machined ribs. Of course, other suitable mechanical mating arrangements can also be used at the interfaces.

In various embodiments, some LRMs can be replaced with LRMs of a different size or having other features or properties. For example, both outer wing LRMs can be replaced with outer wing LRMs that are larger to create a larger aircraft, or outer wing LRMs that are smaller to create a smaller aircraft. Alternatively, or in addition, the center wing LRM and horizontal tail LRM can also be replaced by similar LRMs that are larger or smaller to create an aircraft of a desired size. Many different drone configurations can also be possible though the use of interchangeable LRMs. Various aircraft configurations can include, but are not limited to, a base configuration VTOL drone, a long-distance flight VTOL drone, and a non-VTOL drone, for example.

In its base configuration, the drone can be a hybrid VTOL fixed wing that is designed primarily for forward flight. By simply removing the outer wings LRMs, empennage assembly, and engine LRM, the drone can be easily reconfigured for operation as a quadcopter. A long-distance flight configuration can be particularly useful for delivering a small payload over long distances using smaller and more lightweight LRMs. This can result in shedding extra weight that is typically associated with a heavy-lift VTOL, which cuts into fuel consumption and therefore decreases distance endurance. In such a configuration, base model boom LRMs can be exchanged for boom LRMs having smaller propellers and motors that are able to lift the aircraft but that result in less weight being carried during a mission. Similar LRM exchanges can be made to reduce the weight and flight surface areas of other LRMs, such as wing and tail LRMs. As another configuration, the VTOL system modules can be removed, and the landing gear assembly can be replaced with legs instead of skids such that the drone can perform traditional takeoffs and landings.

In various embodiments and configurations, some or all of the separate LRMs can be provided with unique ejection capabilities that can be used for in-flight emergency management. For example, in the event that the drone is unable to land in a tight area, or while hovering due to high winds close to the ground, the drone could jettison its outer wing modules in an emergency landing. Various arrangements can be used to accomplish this ejection feature. For example, one or more explosive bolts or screws can be used as part of the mechanical locking arrangement. Actuation of these explosive bolts can then result in an outer wing or other LRM being ejected from the remainder of the aircraft.

Figure 3:
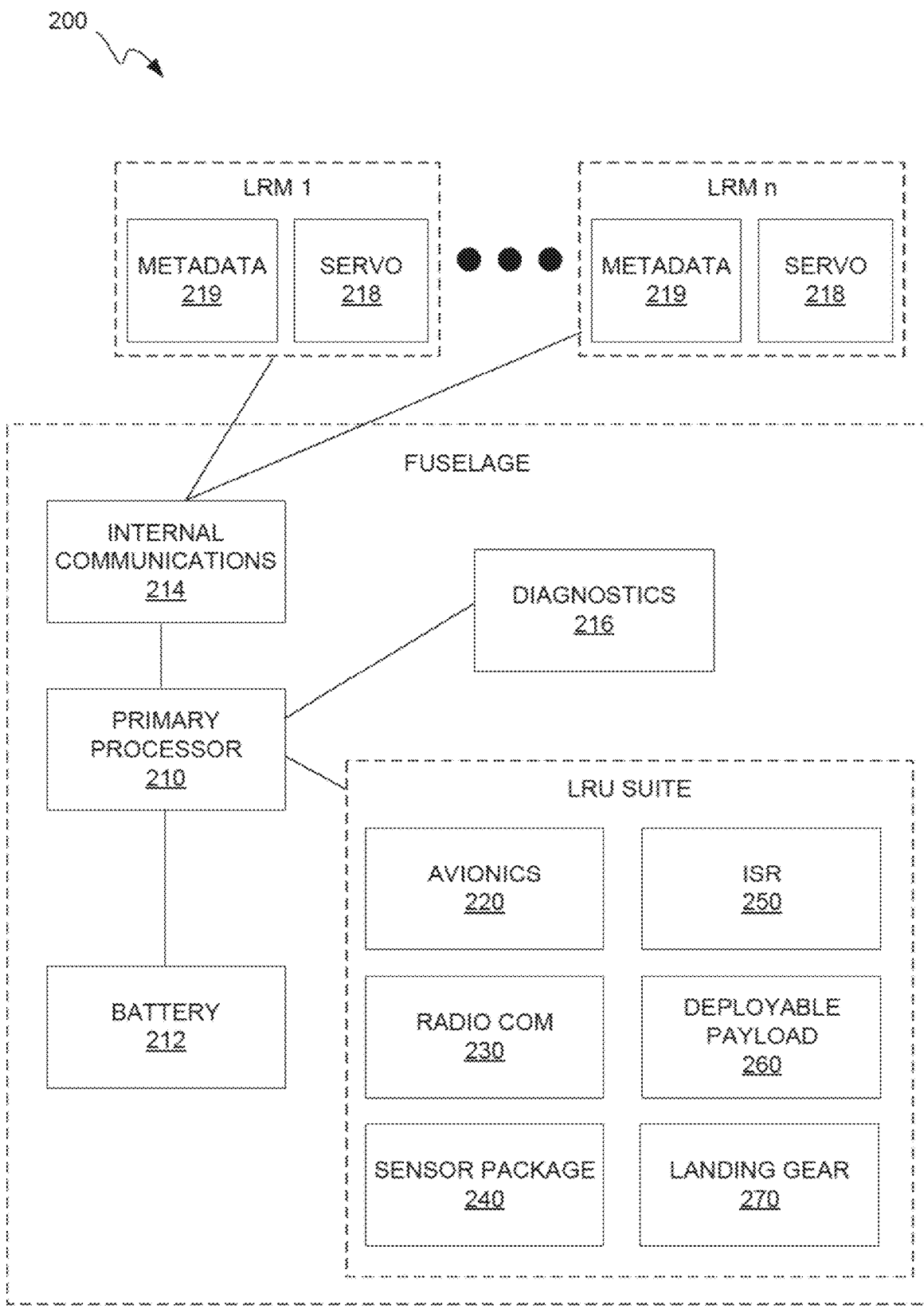
FIG. 3 illustrates a block diagram of an example set of LRUs and related computing architecture for a modular VTOL drone aircraft according to one embodiment of the present disclosure.

FIG. 3 illustrates a block diagram of an example computing architecture for a modular VTOL drone aircraft according to one embodiment of the present disclosure. Computing system 200 can include a primary processor 210, battery 212, communications module 214, diagnostics module 216, servo controllers 218, module metadata chips 219, and various self-contained LRUs. Again, an alternative power source other than a battery can be used in some arrangements. Various servo controllers 218 can be distributed throughout the LRMs as appropriate, while the remaining items can be contained within the fuselage module. Some or all of the LRUs can be contained within the fuselage as well, and these can include, for example, an avionics module 220, a radio communications assembly 230, a sensor package assembly 240, an ISR assembly 250, a deployable payload assembly 260, and a landing gear arrangement 270. Not every LRU need be included in a particular drone configuration, and other LRUs may also be used.

Avionics module 220 can be configured for navigation and flight controls in various settings. Radio communications assembly 230 can be configured for different communication types. Sensor package assembly 240 can be configured with different sensor suites for varying situational awareness requirements. ISR assembly 250 can be configured for different mission types. Deployable payload assembly 260 can provide a universal mounting and power and communication interface. Landing gear arrangement 270 can be configured for landings in different environments and can removed and replaced if damaged during landing.

In various embodiments, diagnostics checks and information gathering for some or all of the different LRMs and/or LRUs can be partially or fully automated. Accordingly, every LRM and LRU can have a local microchip that stores identifying data, configuration data, and other metadata specific to that module or unit. A metadata reporting system can be used to read this data as part of a diagnostics check, as well as for various repair and maintenance purposes. The metadata reporting system can be an interface between outside operation and maintenance software and the hardware of the individual LRMs and LRUs. Access to the data on each module or unit chip can be automated, such as by way of the primary processor on the fuselage of a drone. Alternatively, each module or unit can have a specific port that allows a diagnostic tool or reader to be inserted to read data from the chip. This port can be conveniently located on the LRM or LRU, such that access can be obtained whether the module is coupled to an aircraft or is detached and isolated.

The diagnostic tool or reader can qualify a given module or unit as being good, indicate that it is bad and in need of replacement or repair, or indicate that maintenance is required, such as where a given amount of flight time or distance has been exceeded. Use of this metadata reporting system can serve to automate various maintenance, operational, and diagnostic tasks, reducing the time and paperwork required to ensure airworthiness for a given module or unit. This system can also provide the ability to autonomously report individual aircraft configurations and statuses to fleet management software remotely. This ability provides more accurate and up to date information without having to rely on manual information submissions. Such automated or semiautomated fleet management reporting can minimize aircraft downtime and effectively manage sites with multiple aircraft and operational lanes.

Various uses of the metadata reporting system can include ready informational storage and identification for each LRM and LRU pre-flight configuration checks, automated pre and post flight reports, configuration update notifications, and component flight hour tracking for maintenance purposes. In addition, the metadata reporting system can be used to help with generating flight performance estimates for pre-flight planning, to serve as a payload planning configurator to determine a payload location and the amount of fuel required.

While a portable tool may be used for diagnostic checks, calibration of new LRMs and LRUs, and configuration conformance checks with respect to other LRMs and LRUs on a given drone, it is also specifically contemplated that a built in diagnostic may also be used for performing some or all of these functions on attached LRMs and LRUs. For example, diagnostics module 216 can be built into the drone computing architecture at the drone fuselage. Diagnostics module 216 can perform some of the same check functions as the portable diagnostic tool or reader noted above, as well as additional check functions with respect to newly added and even existing LRMs and LRUs coupled to the drone. Specific functions performed by diagnostics module 216, the portable module checking diagnostic tool, or both, can include, but are not limited to: pre-flight configuration checks, automated pre and post flight reports, configuration update notifications, mass properties logging and tracking, and maintenance logging and tracking, among other possible functions.

Pre-flight configuration checks can include establishing communications with and querying the metadata file for each module to run an automated pre-flight check. The part number of each installed module can be accessed and cross-referenced to a configuration matrix that is embedded in software and paired with avionics firmware. The configuration matrix can list all of the different possible configurations of part numbers that work together. For example, if a wing module has specific functionality that is only compatible with a particular subsystem on the drone and the query registers that the dependent subsystem is not present, then the wing module is reported as being not compatible.

Automated pre and post flight reports can involve compiling all configuration data to provide a digital report that can be uploaded to a fleet management database. A physical copy can also be printed for a drone logbook. Configuration update notifications can involve interaction with a fleet management database and can provide notifications of operational advisories in real-time based upon the particular drone configuration. Links can also be provided to up to date operations manuals based on the reported configuration.

Mass properties logging and tracking can involve recording assembly zero fuel weights, take off weights, sizes, center of gravity locations, and other properties of interest for each module. The configuration file for the module can be appended or updated with the recorded information. The diagnostic check can access these values and determine whether or not they are within allowable ranges for a given drone configuration or mission. In the event that third-party cargo items or payloads, or other components are unable to implement the infrastructure to provide a configuration file, then the option to manually input these values for a third-party component can be made available.

Maintenance and flight hour tracking can involve logging and tracking total flight hours for each module individually, and these values can be recorded within the local configuration file for a module. During pre-flight checks, the part number of each installed module can be cross-referenced to a maintenance interval database that is embedded in software and paired with avionics firmware, for example. The maintenance interval database can be a part-controlled item that lists all of the different maintenance intervals of the entire drone. The system can determine what if any maintenance actions are required based upon tracked component flight hours. When used in conjunction with a flight planner, the system can determine whether or not any components are to exceed a maintenance interval time tolerance during a given mission or flight, and can then provide a warning if such a time tolerance will be exceeded based on flight planning data. For example, a wing module with 99.0 flight hours might be on a drone that is anticipated to fly for 12 hours on its next mission. If there is a maintenance task at 100 hours to replace all wing servos, and there is a maintenance time interval tolerance of 10 hours, then the system can determine that the wing module would exceed the tolerance and present an operational risk to the drone. An automatically generated warning could then indicate that component hours would exceed the planned hours, and a recommendation can be provided either to swap out that wing module or reduce the upcoming mission time.

During post flight reporting, the module configuration file for each separate drone module can be automatically appended with the new flight hours, and the system can check to verify that the before and after flight hours are correct. If an error were to occur that prevented the flight hour logging, the information could be manually updated post-flight as needed. The system can compile a digital report of all component flight hours and any maintenance actions required, and this digital report then can be uploaded to a fleet management database. A physical copy may also be printed for a drone logbook if desired. The system can also provide notifications of service advisories or service bulletins in real-time based upon the component hours for every component module on the drone.

Figure 4:
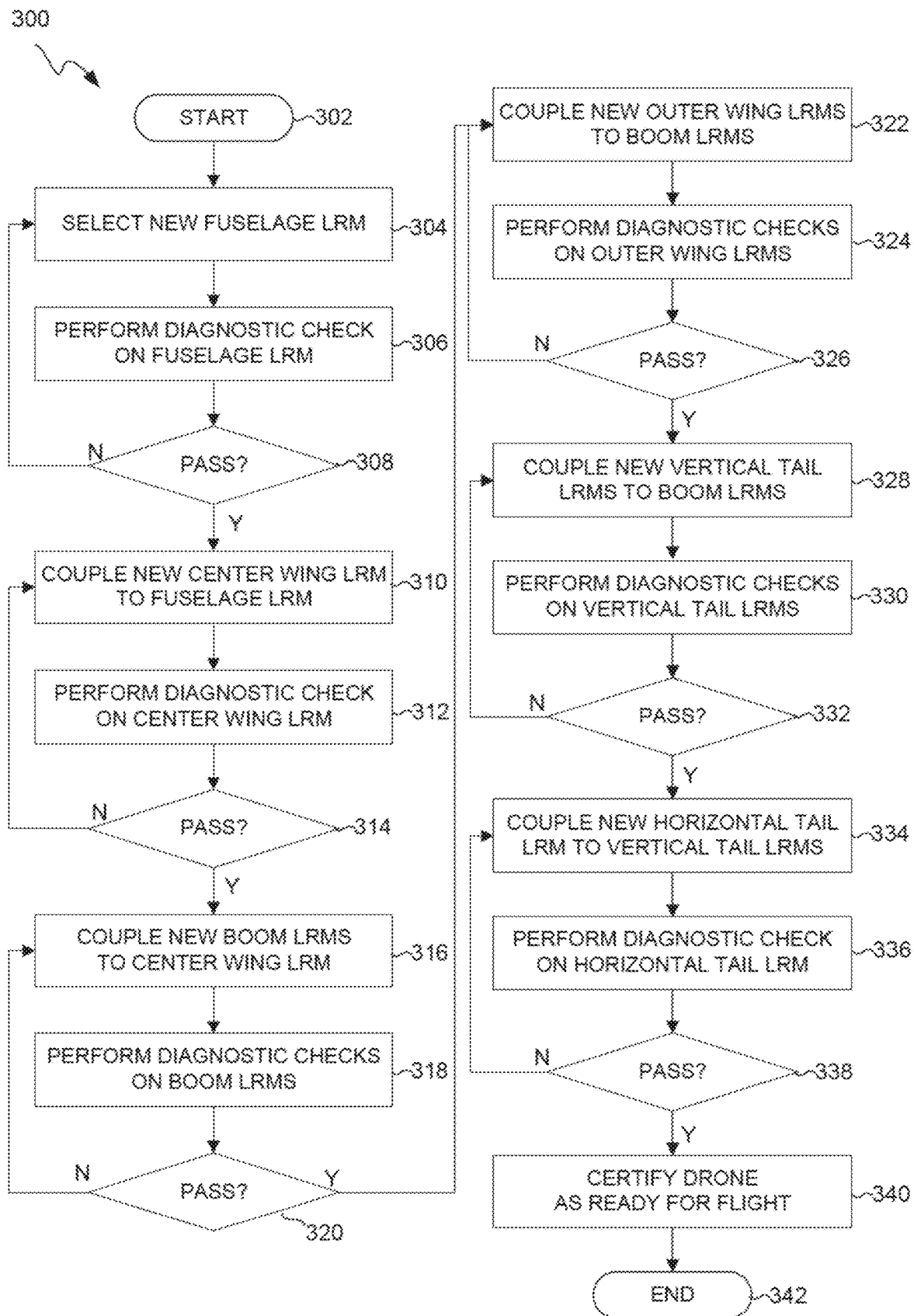
FIG. 4 illustrates a flowchart of an example method of assembling a modular VTOL drone aircraft according to one embodiment of the present disclosure.

Turning next to FIG. 4 a flowchart of an example method of assembling a modular VTOL drone aircraft is provided. It will be understood that method 300 includes a number of potential steps, and that all steps may not be performed in all situations. Furthermore, additional steps not shown may be included, and the order of steps may be altered in some situations. After a start step 302, a new fuselage LRM can be selected at process step 304. This can be a fuselage having the proper configuration and LRUs for the desired mission. At a subsequent process step 306, a diagnostic check can be performed on the selected fuselage LRM.

At decision step 308, an inquiry can be made as to whether the fuselage LRM passed the diagnostic check. If not, then the method can revert back to process step 304 where another fuselage LRM can be selected. Alternatively, appropriate adjustment or repair can be made to the initial fuselage LRM to bring it into compliance. If the fuselage LRM passed the diagnostic check, then a new center wing LRM can be coupled to the fuselage LRM at process step 310. This can involve the blind mate electric and floating connectors discussed above on both LRMs.

At subsequent process step 312, a diagnostic check can be performed on the center wing LRM, and an inquiry can then be made at decision step 314 as to whether the center wing LRM passed the diagnostic check. If not, then the method can revert back to process step 310 for appropriate repair, adjustment, or coupling of another center wing LRM to the fuselage LRM. If the center wing LRM passed the diagnostic check, however, then the method continues to process step 316, where two new boom LRMs can be coupled to the center wing LRM as set forth above. In alternative drone configurations having more than two boom LRMs, then all boom LRMSs can be coupled at step 316.

At the next process step 318, a diagnostic check can be performed on all of the boom LRMs, and an inquiry can then be made at decision step 320 as to whether all boom LRMs passed their diagnostic checks. If not, then the method can revert back to process step 316 for repair, adjustment, or coupling of one or more new boom LRMs to the center wing LRM, as may be appropriate. If the boom LRMs passed the diagnostic check, however, then the method continues to process step 322, where two new outer wing LRMs can be coupled to the boom LRMs as set forth above.

At the following process step 324, diagnostic checks can be performed on both of the outer wing LRMs, and an inquiry can then be made at decision step 326 as to whether both outer wing LRMs passed their diagnostic checks. If not, then the method can revert back to process step 322 for repair, adjustment, or coupling of one or two new outer wing LRMs to the boom LRM or LRMs, as may be appropriate. If both outer wing LRMs passed their diagnostic checks, however, then the method continues to process step 328, where two new vertical tail LRMs can be coupled to respective boom LRMs as set forth above.

At subsequent process step 330, diagnostic checks can be performed on both of the vertical tail LRMs, and an inquiry can then be made at decision step 332 as to whether both vertical tail LRMs passed their diagnostic checks. If not, then the method can revert back to process step 328 for repair, adjustment, or coupling of one or two new vertical tail LRMs to the boom LRM or LRMs, as may be appropriate. If both outer vertical tail LRMs passed their diagnostic checks, however, then the method continues to process step 334, where a new horizontal tail LRM can be coupled to both of the vertical tail LRMs as set forth above.

A diagnostic check can be performed on the horizontal tail LRM at process step 336, after which an inquiry can be made at decision step 338 as to whether the horizontal tail LRM passed this diagnostic check. If not, the method reverts back to process step 334 for appropriate adjustment, repair, or replacement of the horizontal tail LRM. When the horizontal tail LRM passes its diagnostic check, such that all module diagnostic checks have resulted in a pass, then the method continues to process step 340, where the drone is certified as being ready for flight. The method then ends at end step 342.

Again, other steps not included in this illustrative method may also be included in a method of assembling a modular VTOL drone aircraft. For example, coupling an engine LRM to the fuselage LRM and performing a diagnostic check on the engine LRM may also be included. These particular engine LRM steps can be performed at any time in process, but preferably after the fuselage LRM has passed its diagnostic check. Other method steps and details are also possible.

Figure 5:
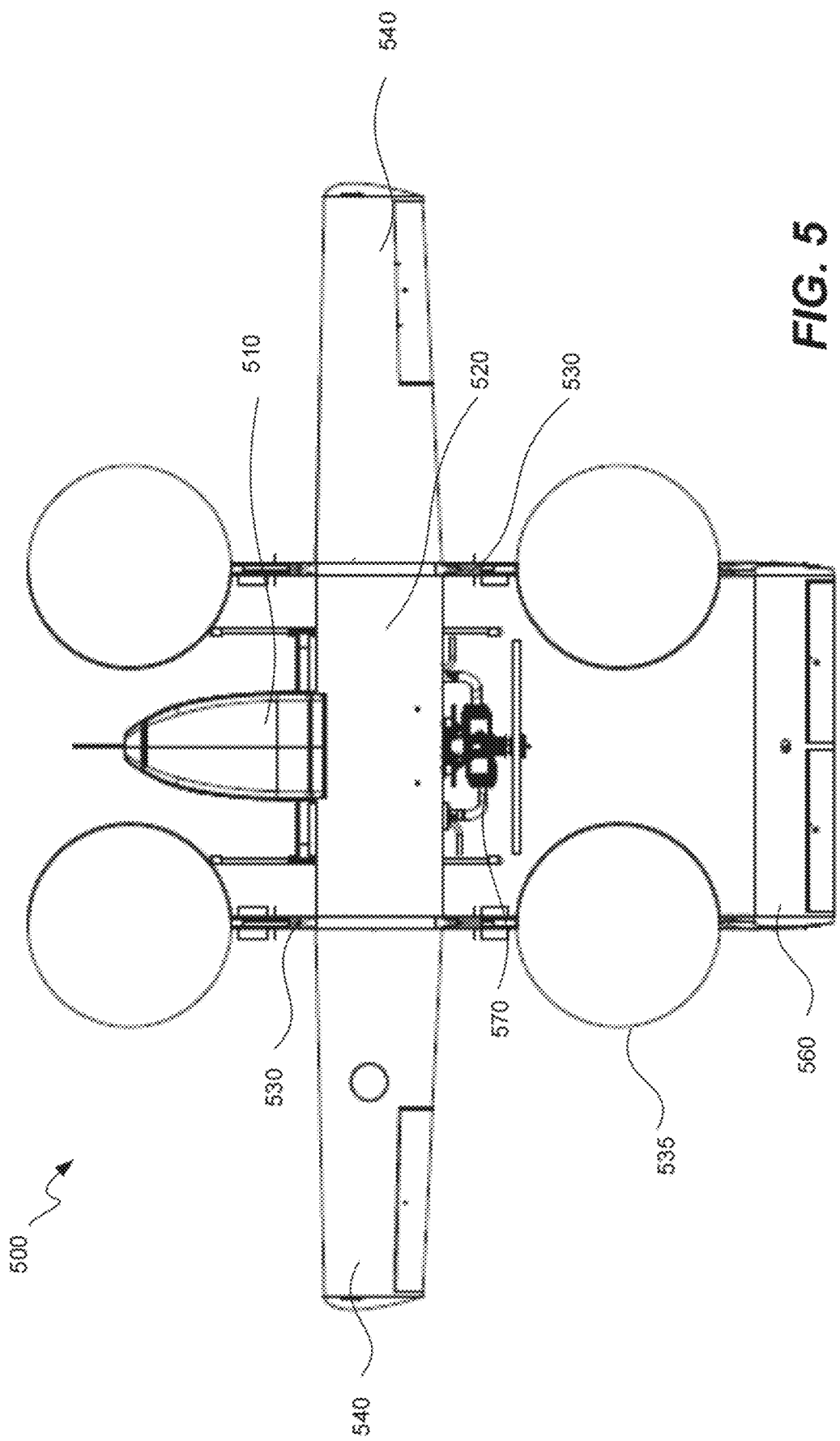
FIG. 5 illustrates in top plan view an example alternative modular VTOL drone aircraft configured with smaller propellers according to one embodiment of the present disclosure.

Although the foregoing discussion has focused primarily on a drone 100 having a base VTOL configuration, many other drone configurations are also possible and can be readily enabled by the modular nature of the various LRMs and LRUs disclosed herein. Several non-limiting examples of alternative drone configurations will now be presented for illustrative purposes. FIG. 5 illustrates in top plan view an alternative example modular VTOL drone aircraft configured with smaller propellers. Drone 500 can be similar to drone 100 above, in that it can have a fuselage module 510, a center wing module 520, two boom modules 530 with propellers 535, two outer wing modules 540, a horizontal tail module 560, and an engine module 570. Propellers 535 can be smaller than the propellers on drone 100 above. For example, propellers 535 might have a 32-inch diameter, while the propellers on drone 100 above might have a 36-inch diameter. Smaller diameter propellers might be preferable for transporting lighter weight payloads or overall drones, for example, such that less lift and thus less power are required.

Figure 6:
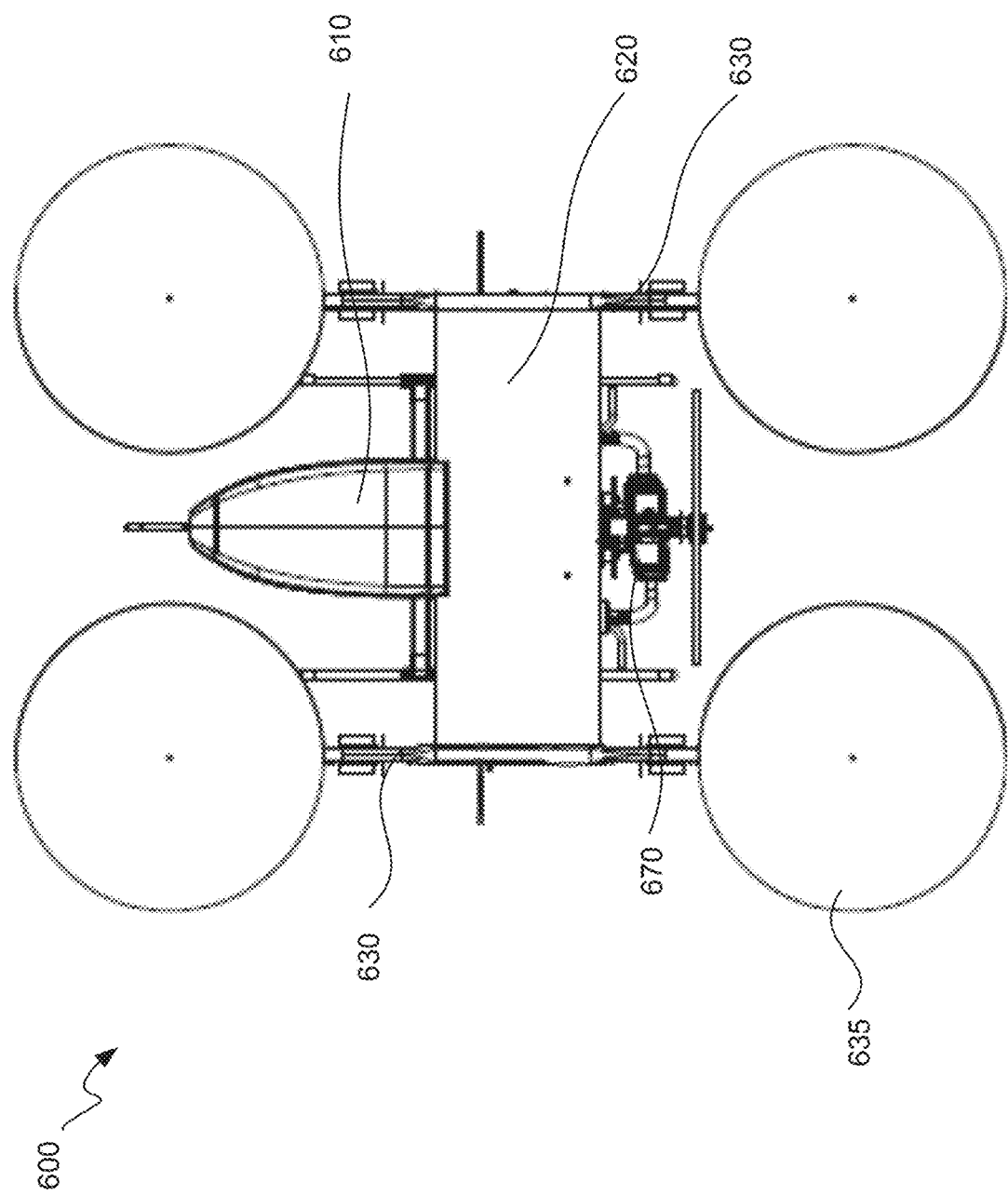
FIG. 6 illustrates in top plan view an example alternative modular VTOL drone aircraft configured as a quadcopter with an engine according to one embodiment of the present disclosure.

As another possible configuration, FIG. 6 illustrates in top plan view a different alternative example modular VTOL drone aircraft configured as a quadcopter with an engine, Drone 600 can also be similar to drone 100 above, in that it can have a fuselage module 610, a center wing or connector module 620, two boom modules 630 with propellers 635, and an engine module 670. However, drone 600 does not have any outer wing modules or tail modules. Further, drone 600 can have only four propellers 635, rather than the eight propellers on drone 100 above. This configuration for drone 600 might be suitable where long distance flights at a cruising altitude are not needed, for example.

Figure 7:
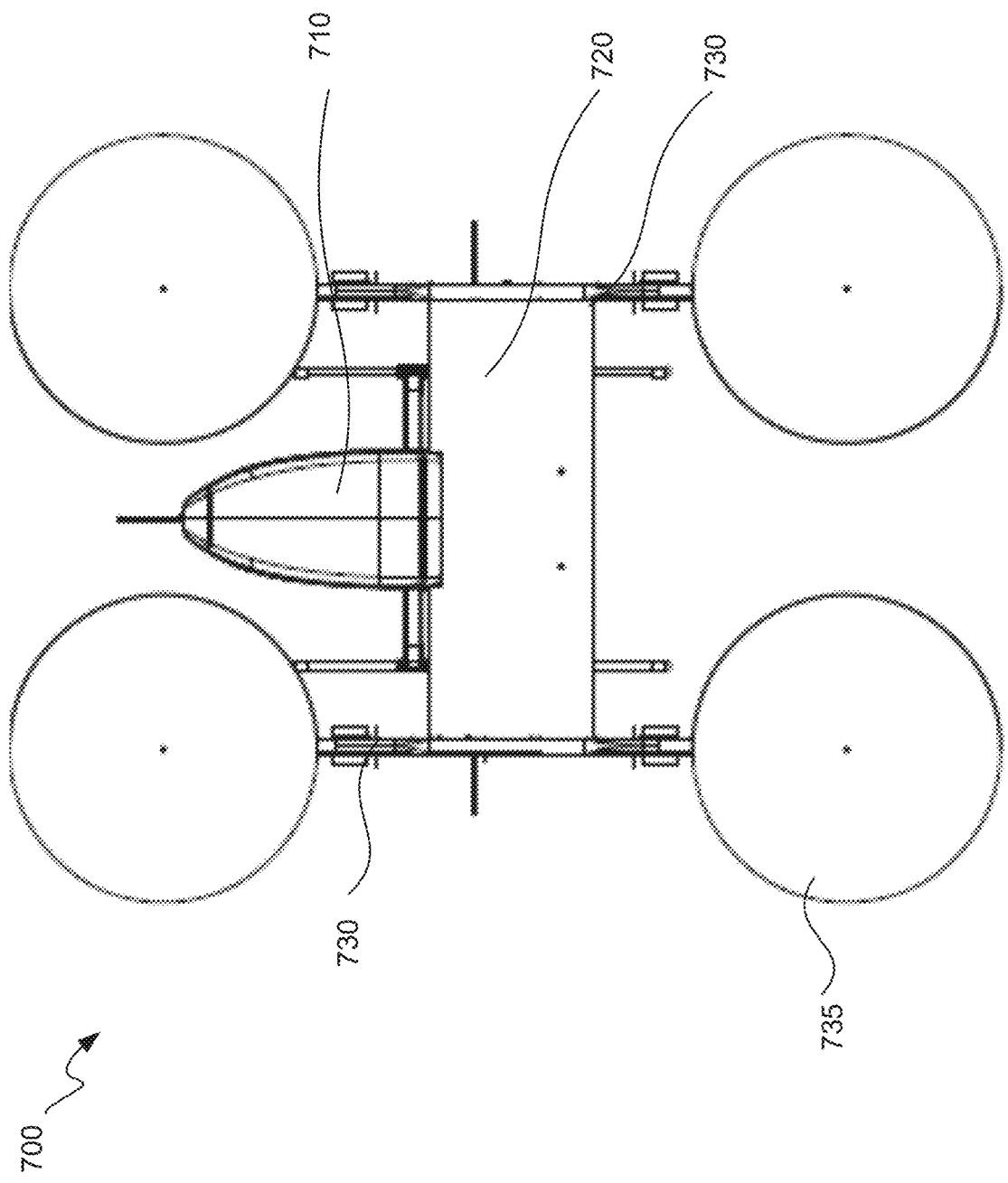
FIG. 7 illustrates in top plan view an example alternative modular VTOL drone aircraft configured as a quadcopter with no engine according to one embodiment of the present disclosure.

As yet another possible configuration, FIG. 7 illustrates in top plan view another alternative example modular VTOL drone aircraft configured as a quadcopter with no engine. Drone 700 can similarly have a fuselage module 710, a center wing or connector module 720, and two boom modules 730 with four propellers 735. No outer wing, tail, or engine modules are included on drone 700. This configuration for drone 700 might be suitable where no significant distance flying is needed, for example, such that a pure quadcopter configuration is sufficient.

Figure 8:
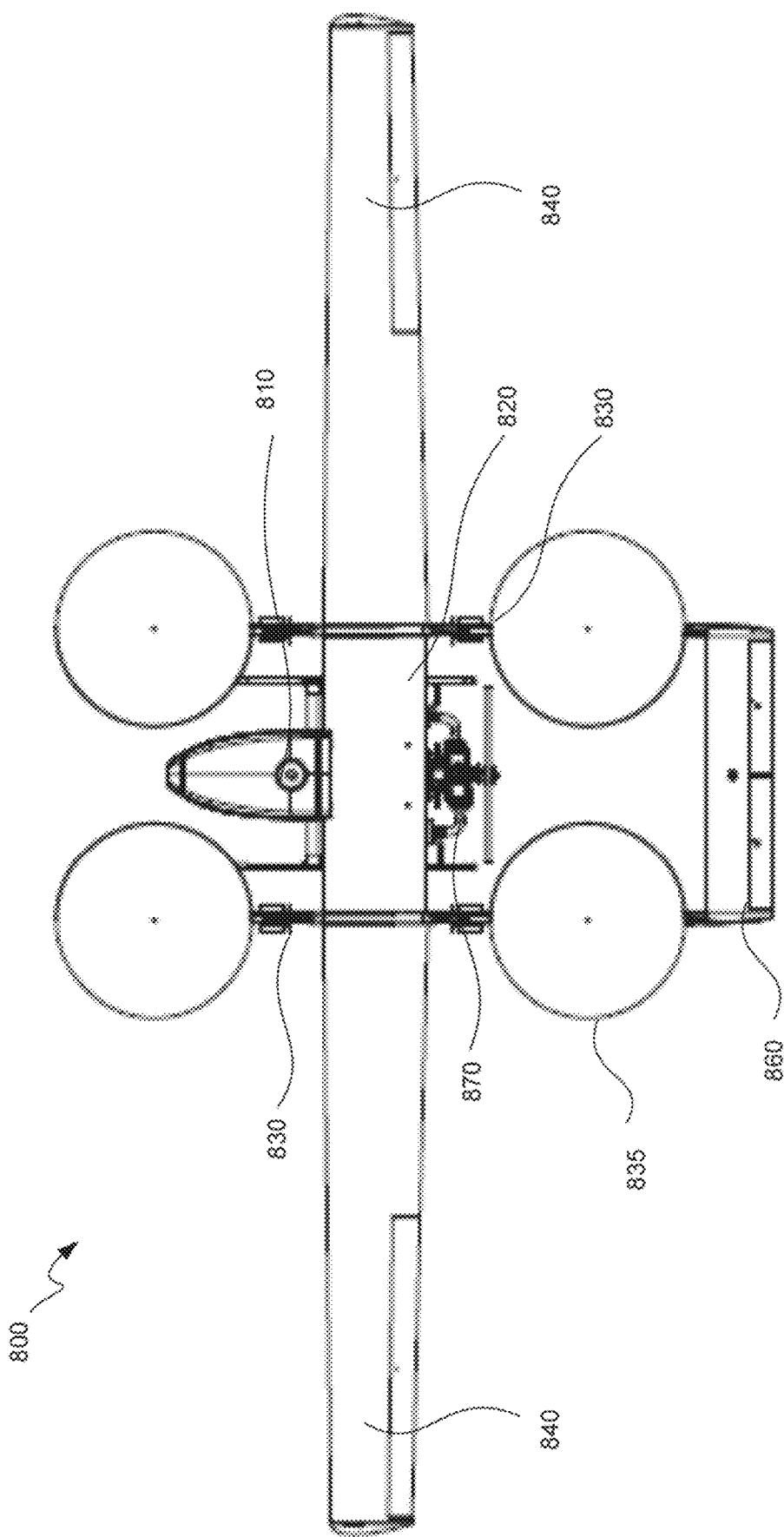
FIG. 8 illustrates in top plan view an example alternative modular VTOL drone aircraft configured with outer wings having higher aspect ratios according to one embodiment of the present disclosure.

As still another possible drone configuration, FIG. 8 illustrates in top plan view yet another alternative example modular VTOL drone aircraft configured with outer wings having higher aspect ratios. Drone 800 can also be similar to drone 100 above, in that it can have a fuselage module 810, a center wing module 820, two boom modules 830 with propellers 835, a horizontal tail module 860, and an engine module 870. Outer wing modules 840 can have significantly higher aspect ratios relative to other modular drones disclosed herein, thus providing drone 800 with a much wider wingspan.

It will be readily appreciated that many other configurations are also possible, as may be instituted for a given drone function need and enabled by the modular nature of so many major drone components. As yet another non-limiting example, a drone can be configured with wing modules having a higher wing aspect ratio to facilitate faster flight, or with wing modules having a lower wing aspect ratio to facilitate slower flight.

Although the foregoing disclosure has been described in detail by way of illustration and example for purposes of clarity and understanding, it will be recognized that the above described disclosure may be embodied in numerous other specific variations and embodiments without departing from the spirit or essential characteristics of the disclosure. Certain changes and modifications may be practiced, and it is understood that the disclosure is not to be limited by the foregoing details, but rather is to be defined by the scope of the appended claims.

What is claimed is:

1. A Vertical Take-Off and Landing ("VTOL") drone aircraft, comprising:
   a fuselage;
   a primary processor located at the fuselage;
   a plurality of propellers;
   a self-contained line replaceable unit ("LRU") removably coupled to the fuselage, wherein the LRU is an avionics module, a radio communications assembly, a sensor package assembly, an intelligence, surveillance, and reconnaissance ("ISR") assembly, or a deployable payload assembly; and
   a first self-contained line replaceable module ("LRM") having a first interface configured to removably couple the first LRM to the VTOL drone aircraft, wherein the first LRM is a wing assembly, a tail assembly or, a boom;
   an engine module, wherein the engine module is self-contained and is configured to be removably coupled to the fuselage, and
   wherein the first LRM includes an electrical item and wherein the primary processor is configured to access an onboard maintenance interval database and perform a diagnostic check on the wing assembly, the tail assembly or the boom when the first LRM is initially coupled to the VTOL drone aircraft, and wherein the diagnostic check is based at least on whether a given amount of flight time or distance has been exceeded.

2. The VTOL drone aircraft of claim 1, wherein the first interface includes an electrical connection configured to transmit electrical power to the electrical item.

3. The VTOL drone aircraft of claim 1, wherein the first interface includes communication connections configured to transmit communications from a processor to the electrical item.

4. The VTOL drone aircraft of claim 1, wherein the first LRM is interchangeable with a second LRM of a different size, having different functionalities, or both such that the second LRM can also couple to the VTOL drone aircraft in place of the first LRM.

5. The VTOL drone aircraft of claim 1, further comprising:
a second self-contained LRM having a second interface configured to couple the second LRM to the remainder of the VTOL drone aircraft.

6. The VTOL drone aircraft of claim 5, wherein the first LRM is a wing assembly and the second LRM is a tail assembly.

7. The VTOL drone aircraft of claim 5, wherein the first LRM is a wing assembly and the second LRM is a boom that includes multiple propellers from the plurality of propellers coupled thereto.

8. The VTOL drone aircraft of claim 7, wherein the boom further includes a separate dedicated electronic speed control unit for each of the multiple propellers.

9. The VTOL drone aircraft of claim 7, wherein the wing assembly is removably coupled to the fuselage and the boom is removably coupled to the wing assembly.

10. The VTOL drone aircraft of claim 1, further comprising:
third through tenth LRMs, wherein each of the respective third through tenth LRMs is self-contained and includes a separate interface configured to couple the respective LRM to the remainder of the VTOL drone aircraft.

11. The VTOL drone aircraft of claim 1, wherein the primary processor is configured to detach the first LRM from the remainder of the VTOL drone aircraft while the VTOL drone aircraft is in flight.

12. The VTOL drone aircraft of claim 1, wherein the primary processor, as a result of the diagnostic check, qualifies the first LRM as either being good, in need of replacement or repair, or in need of maintenance.

13. The VTOL drone aircraft of claim 1, wherein the primary processor, as a result of the diagnostic check, qualifies the first LRM as in need of maintenance due to a flight time threshold or distance threshold being exceeded.

14. The VTOL drone aircraft of claim 1, wherein the primary processor, as a result of a diagnostic check on the first LRM indicating the first LRM is in need of replacement, initiates repair of the first LRM.

15. The VTOL drone aircraft of claim 1, wherein the primary processor cross-references the maintenance interval database with a part number of the first LRM.

16. The VTOL drone aircraft of claim 15, wherein the primary processor, in conjunction with a flight planner, automatically provides a warning when the primary processor determines the first LRM exceeds a maintenance interval tolerance based on flight planning data of the flight planner and the part number.

17. The VTOL drone aircraft of claim 16, wherein the primary processor provides an indication to either swap out the first LRM or reduce an upcoming mission time.

* * * * *